(12) United States Patent
Spears

(10) Patent No.: US 9,462,236 B2
(45) Date of Patent: Oct. 4, 2016

(54) IMAGING USING OFFSETTING ACCUMULATIONS

(71) Applicant: HEWLETT-PACKARD DEVELOPMENT COMPANY, L.P., Houston, TX (US)

(72) Inventor: Kurt Eugene Spears, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/833,763

(22) Filed: Aug. 24, 2015

(65) Prior Publication Data

US 2015/0365637 A1  Dec. 17, 2015

Related U.S. Application Data

(63) Continuation of application No. 13/651,389, filed on Oct. 13, 2012, now Pat. No. 9,143,696.

(51) Int. Cl.
| | |
|---|---|
| *H04N 5/335* | (2011.01) |
| *H04N 5/228* | (2006.01) |
| *H04N 5/222* | (2006.01) |
| *H04N 9/04* | (2006.01) |
| *H04N 5/225* | (2006.01) |
| *H04N 5/235* | (2006.01) |

(52) U.S. Cl.
CPC .............. *H04N 9/04* (2013.01); *H04N 5/2256* (2013.01); *H04N 5/2351* (2013.01); *H04N 5/2354* (2013.01)

(58) Field of Classification Search
CPC .... H04N 5/235; H04N 5/2355; H04N 3/155; H04N 5/2353; H04N 5/43; H04N 5/3535; H04N 5/35581; H04N 5/374; H04N 1/6086; H04N 2209/045; H04N 5/2176; H04N 5/35545; H04N 5/35554; H01L 27/14621
USPC ......... 348/96, 222.1, 223.1, 224.1, 296–297, 348/371
See application file for complete search history.

(56) References Cited

U.S. PATENT DOCUMENTS

| | | | |
|---|---|---|---|
| 5,499,111 | A | 3/1996 | Sato et al. |
| 5,748,232 | A | 5/1998 | Konuma |
| 7,023,536 | B2 | 4/2006 | Zhang et al. |
| 7,038,846 | B2 | 5/2006 | Mandella et al. |
| 7,088,440 | B2 | 8/2006 | Buermann et al. |

(Continued)

OTHER PUBLICATIONS

Gao, Rui et al; Microsoft Research-Mobile Surface; 2010; http://research.microsoft.com/en-us/projects/mobilesurface/ (1 page).

(Continued)

*Primary Examiner* — Trung Diep
(74) *Attorney, Agent, or Firm* — HP Inc Patent Department

(57) ABSTRACT

In some examples, a light source is controlled to output light. A sensor element outputs first detections responsive to a combined light comprising ambient light and the light output by the light source when the light source is on, and outputs second detections responsive to ambient light when the light source is off. The first detections are routed to a first accumulator to produce a first accumulation, and the second detections are routed to a second accumulator to produce a second accumulation. An adjusted output image is generated by removing a contribution of the second accumulation from the first accumulation.

18 Claims, 4 Drawing Sheets

(56) References Cited

U.S. PATENT DOCUMENTS

| | | | |
|---|---|---|---|
| 7,110,100 | B2 | 9/2006 | Buermann et al. |
| 7,113,270 | B2 | 9/2006 | Buermann et al. |
| 7,161,664 | B2 | 1/2007 | Buermann et al. |
| 7,203,384 | B2 | 4/2007 | Carl et al. |
| 7,268,956 | B2 | 9/2007 | Mandella et al. |
| 7,327,500 | B2 * | 2/2008 | Sakakibara ............ H04N 9/045 348/280 |
| 7,474,809 | B2 | 1/2009 | Carl et al. |
| 7,599,561 | B2 | 10/2009 | Wilson et al. |
| 7,710,391 | B2 | 5/2010 | Bell et al. |
| 7,729,515 | B2 | 6/2010 | Mandella et al. |
| 7,826,641 | B2 | 11/2010 | Mandella et al. |
| 7,961,909 | B2 | 6/2011 | Mandella et al. |
| 7,969,494 | B2 | 6/2011 | Ladd et al. |
| 8,004,502 | B2 | 8/2011 | Keam |
| 8,121,640 | B2 | 2/2012 | Russ et al. |
| 8,199,117 | B2 | 6/2012 | Izadi et al. |
| 8,736,583 | B2 | 5/2014 | Anderson et al. |
| 2004/0145674 | A1 * | 7/2004 | Hoppe ................. H04N 5/2354 348/371 |
| 2004/0240003 | A1 * | 12/2004 | Sakakibara ............ H04N 1/486 358/505 |
| 2005/0078092 | A1 | 4/2005 | Clapper |
| 2005/0168437 | A1 | 8/2005 | Carl et al. |
| 2007/0248342 | A1 * | 10/2007 | Tamminen ............... G03B 7/16 396/67 |
| 2008/0018591 | A1 | 1/2008 | Pittel et al. |
| 2010/0289885 | A1 | 11/2010 | Lu et al. |
| 2011/0012866 | A1 | 1/2011 | Keam |
| 2011/0227915 | A1 | 9/2011 | Mandella et al. |
| 2011/0242054 | A1 | 10/2011 | Tsu |
| 2012/0019494 | A1 | 1/2012 | Lum et al. |
| 2012/0038549 | A1 | 2/2012 | Mandella et al. |
| 2013/0077236 | A1 | 3/2013 | Becze et al. |
| 2013/0194418 | A1 | 8/2013 | Gonzalez-Banos et al. |

OTHER PUBLICATIONS

Hand, Randall; Infinite Z Launches zSpace Virtual Holographic 3D Display for Designers; VizWorld.com; Dec. 13, 2011; http://www.vizworld.com/2011/12/infinite-launches-zspace-virtual-holographic-3d-display-designers/#sthash.j6Ys61PX.dpbs (2 pages).

Harrison, Beverly & Ziola, Ryder; Bringing Toys to Life: Intel Labs OASIS Project; Augmented Engineering; Jan. 26, 2011; http://augmentedengineering.wordpress.com/2011/01/26/bringing-toys-to-life-intel-labs-oasis-project/ (1 page).

Harrison, Chris et al; OmniTouch: Wearable Multltouch Interaction Everywhere; UIST'11; Oct. 16, 2011; Santa Barbara, California; http://research.mIcrosoft.com/en-us/um/people/awllson/publIcatIons/HarrIsonUIST2011/HarrIsonUIST2011.html (10 pages).

Hartmann, Bjorn et al; Pictionaire: Supporting Collaborative Design Work by Integrating Physical and Digital Artifacts; CSCW 2010; Feb. 6, 2010; Savannah, Georgia; http://research.microsoft.com/en-us/um/people/awilson/publications/HartmannCSCW2010/HartmannCSCW2010.html (4 pages).

Hinckley, Ken et al; Pen + Touch = New Tools; UIST'10; Oct. 3, 2010; New York, New York; http://research.microsoft.com/en-us/um/people/awilson/publications/HinckleyUIST2010/HinckleyUIST2010.html, 10 pages.

Izadi, Shahram et al; C-Slate: A Multi-Touch and Object Recognition System for Remote Collaboration Using Horizontal Surfaces; IEEE; 2007; http://research.microsoft.com/pubs/132551/cslate1.pdf, 8 pages.

Junuzovic, Sasa et al; Microsoft Research-IllumiShare; Microsoft Research; 2012; http://research.microsoft.com/en-us/projects/illunnishare/default.aspx (2 pages).

Kane, Shaun K. et al; Bonfire: A Nomadic System for Hybrid Laptop-Tabletop Interaction; UIST'09; Oct. 4, 2009; Victoria, British Columbia, Canada; http://dub.washington.edu/djangosite/media/papers/uist09.pdf (10 pages).

Linder, Natan et al; LuminAR: Portable Robotic Augmented Reality Interface Design and Prototype; UIST '10, Oct. 3, 2010; New York, New York; http://fluid.media.mit.edu/sites/default/files/2010-10-03-luminar_uist10_demo.pdf (2 pages).

Melanson, Donald; Microsoft Research Working on Portable Surface; Mar. 2, 2010; http://www.engadget.com/2010/03/02/microsoft-research-working-on-portable-surface/ (2 pages).

Melanson, Donald; Wiimote Repurposed for Multi-Point Interactive Whiteboard; Dec. 10, 2007; http://www.engadget.com/2007/12/10/wiimote-repurposed-for-multi-point-interactive-whiteboard/ 2 pages.

Oike, Y. et al; A Pixel-level Color Image Sensor with Efficient Ambient Light Suppression Using Modulated RGB Flashlight and Application to TOF Range Finding; http://ieeexplore.ieee.org/stamp/stamp.jsp?arnumber=1346595 > On pp. 298-301; Jun, 17-19, 2004.

Shahram Izadi et al., "C-Slate: A Multi-Touch and Object Recognition System for Remote Collaboration using Horizontal Surfaces," Second Annual IEEE International Workshop on Horizontal Interactive Human-Computer System, 2007, pp. 3-10.

Simonite, Tom; A Kitchen Countertop With a Brain; MIT Technology Review; Jul. 2, 2010; http://www.technologyreview.com/news/419639/a-kitchen-countertop-with-a-brain/ (2 pages).

Wilson, Andrew D. et al; Combining Multiple Depth Cameras and Projectors for Interactions On, Above, and Between Surfaces; UIST'10; Oct. 3, 2010; New York, New York; http://research.microsoft.com/en-us/um/people/awilson/publications/WilsonUIST2010/WilsonUIST2010.html (10 pages).

Wilson, Andrew D.; Using A Depth Camera as a Touch Sensor; ITS 2010: Devices & Algorithms; Nov. 7, 2010; Saarbrucken, Germany; http://research.microsoft.com/en-us/um/people/awilson/publications/WilsonITS2010/WilsonITS2010.html (4 pages).

* cited by examiner

IMAGING USING OFFSETTING ACCUMULATIONS

CROSS REFERENCE TO RELATED APPLICATION

This is a continuation of U.S. application Ser. No. 13/651,389, filed Oct. 13, 2012, which is hereby incorporated by reference.

BACKGROUND

The colors in an image can be determined, not only by the colors of objects in the scene being imaged, but also by the colors used to illuminate the objects in the scene. Photographers often take advantage of this, e.g., by using low-color-temperature light to make skin tones appear warmer. On the other hand, if an image is to represent the actual colors of an object, illumination color can be carefully controlled. For example, document scanners use carefully specified illumination sources to achieve known effective color temperatures. In addition, typical document scanners employ covers to exclude ambient light (which is less likely to be controlled) from the object being scanned.

BRIEF DESCRIPTION OF THE DRAWINGS

The following figures represent examples and not the invention itself.

DETAILED DESCRIPTION

Excluding or otherwise controlling ambient light is not always possible. For example, when photographing a car or wall to obtain a color sample for paint matching purposes, it may not be possible to exclude or control ambient light. "White-balancing" can be used to compensate for color shifts due to ambient light color. However, this typically involves acquiring an image of a standard white sheet, which may be inconvenient. Also, such an approach may not be as effective as desired where the ambient light varies spatially over an image and over time. For example, a white-balance setting can be invalidated by a passing shadow or flickering light.

Examples described hereinbelow use accumulation offsetting to compensate for ambient light even where the ambient light varies over the imaged object and/or over time. In some examples, this approach can be used to obtain a more color-accurate image of a scene.

Figure 1:
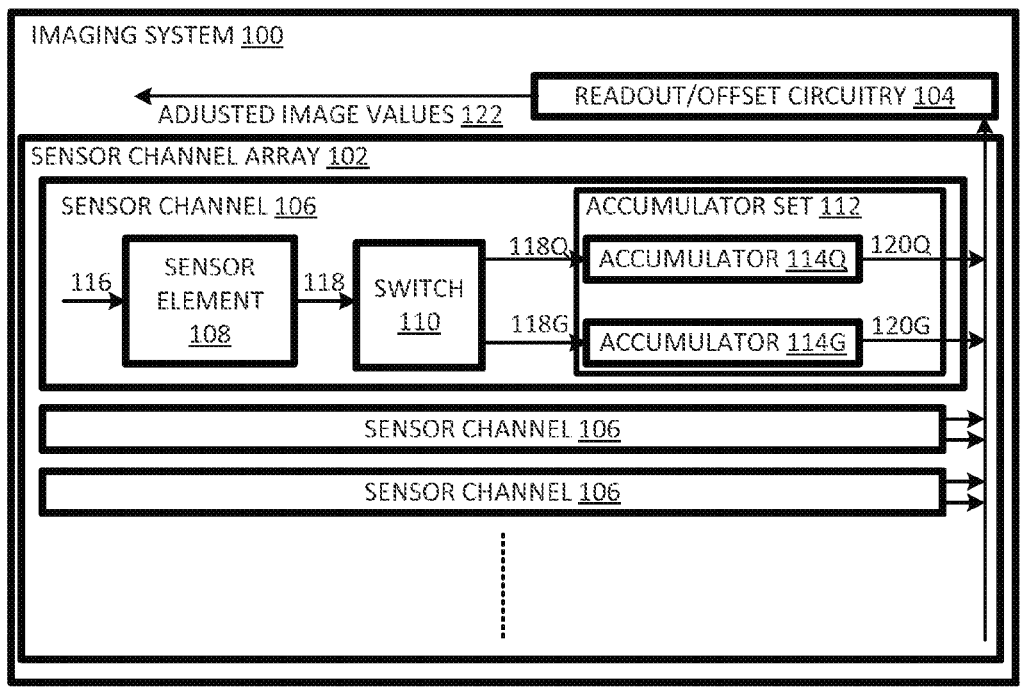
FIG. 1 is a schematic diagram of an imaging system in accordance with an example.

An imaging system 100, shown in FIG. 1, includes a sensor-channel array 102 and readout/offset circuitry 104. Sensor-channel array 102 includes an array of sensor channels 106. Each sensor channel 106 includes a respective sensor element 108, a respective switch 110, and a respective accumulator set 112 of accumulators, including a "gross" accumulator 114G and an "offset" accumulator 114Q. Herein, "gross" and "offset", when used to qualify "accumulator" and its relatives, are mnemonic labels for the way the accumulators are used.

Sensor elements 108 are to detect incident light 116 and convert it to detections. Switches 110 are to partition detections 118 into gross detections 118G and offset detections 118Q. Gross accumulators 114G are to accumulate gross detections 118G to yield gross accumulations 120G, while offset accumulators 114Q are to accumulate offset detections 118Q to yield offset accumulations 120Q. Readout/offset circuitry 104 is to read gross accumulations 120G from gross accumulators 114G and to read offset accumulations 120Q from offset accumulators 114Q. Readout/offset circuitry 104 is further to offset gross accumulations 120G by respective offset accumulations 120Q to yield adjusted image values 122.

Figure 2:
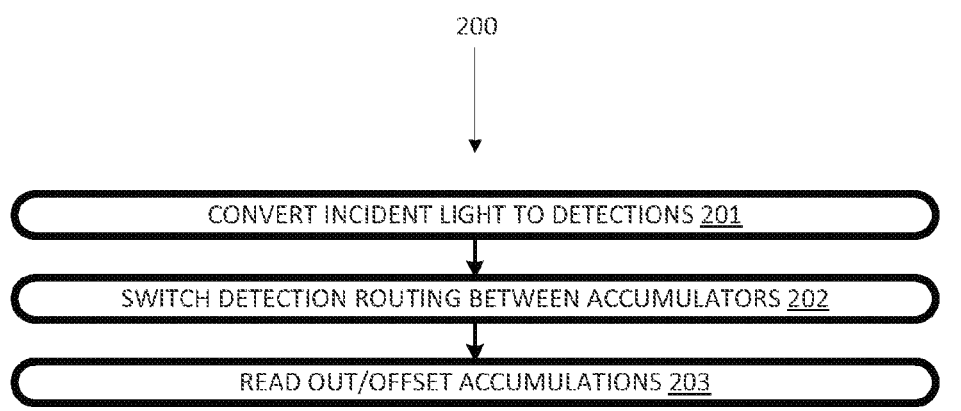
FIG. 2 is a flow chart of an imaging process in accordance with an example.

An imaging process 200, flow-charted in FIG. 2, may be implemented using imaging system 100 or another system. At 201, incident light is converted to detections. At 202, detection routings are switched between gross and offset accumulators to yield respective gross and offset accumulations. At 203, gross and offset accumulations and read out from the respective accumulators so that the gross accumulations are offset by respective offset accumulations to yield adjusted image values.

In one of several possible applications for process 200, a light source can be switched on and off to yield pulses of emitted light. Detection routings can be switched so that detections resulting from incident light that is a combination (which would occur during a pulse) of reflections of controlled illumination and ambient light are routed to gross accumulators, while detections (e.g., occurring between pulses) resulting from ambient light only are routed to offset accumulators. In that case, the resulting adjusted image values represent incident light associated only with controlled illumination, e.g., to provide accurate color intensity and hue information.

The ambient detections can occur just before and/or just after the detections of combined light. Thus, the gross and offset detections can occur close in time, minimizing challenges due to temporally varying ambient illumination. Errors due to temporally-varying ambient light can be further reduced by interleaving the gross and offset accumulations. First (e.g., "gross") and second (e.g., "offset") accumulations are said to be "interleaved" when, for a given sensor channel: 1) for some first detections in a respective first accumulator, there are second detections in a respective second accumulator that were obtained prior to the first detections and some that were obtained after the first detections; and 2) for some second detections in the respective second accumulator, there are first detections in the respective first accumulator that were obtained before the second detections and some that were obtained after the second detections.

The advantage of interleaving can be understood using an example in which 16 milliseconds (ms) are available for image capture. In a non-interleaved variation (GAQ), the first 8 ms are used for gross illumination detections and the second 8 ms are used for ambient-only illumination detections; in this non-interleaved case, there is an average of 8 ms available for compensation errors to occur due to changes in ambient illumination. As explained in the next paragraph, interleaving can reduce the average time available for changes in ambient illumination to cause ambient-light compensation errors.

In a first interleaved variation (GAGAQ), the first 4 ms are allotted to gross illumination detections, the second 4 ms are allotted to ambient illumination detections, the third 4 ms are allocated to gross illumination detections, and the fourth 4 ms are used for ambient illumination detections. In this case, there is an average of only 4 ms available for compensation errors to occur due to changes in ambient illumination. In a further example of interleaving, in which 1 ms is allocated to each phase of the pattern GAGAGAGAGA-GAGAGAQ, there is an average of only 1 ms for compensation errors to occur due to changes in ambient illumination. Thus, compensation errors due to temporal variations in ambient lighting can be reduced to the extent that interleaving temporally overlaps the gross and ambient illumination detections between readouts.

The ambient-light compensation is on a per-sensor-channel basis, which addresses the challenge of spatially-varying ambient illumination. In a variation in which all sensor channels have the same color sensitivity, system 100 compensates for the amount of ambient illumination incident to the respective sensor element. In a variation in which sensor channels are dedicated to different colors, e.g., due to the use of color filters with otherwise full-range sensor elements 108, system 100 can address spatial variations in the color temperature of the ambient illumination. In the following example, spatial variations in ambient illumination are addressed in a system in which all sensor channels have the same color sensitivity by using sequential illumination using different colors.

Figure 3:
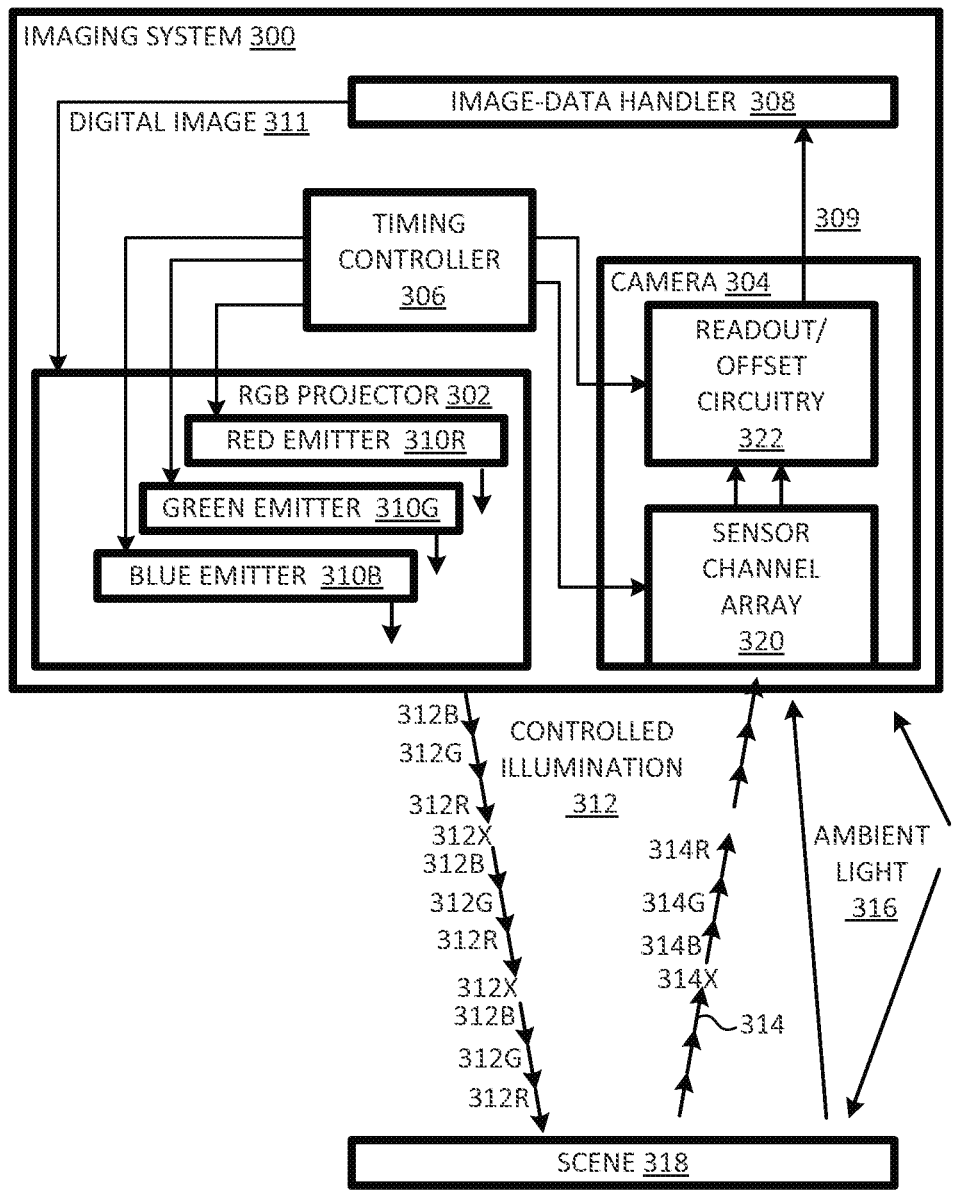
FIG. 3 is a schematic diagram of a full-color imaging system in accordance with an example.

An example full-color imaging system 300 includes an RGB projector 302, a camera 304, a timing controller 306, and an image-data handler 308, as shown in FIG. 3. Timing controller 306 synchronizes (coordinates the timings of) RGB projector 302 and camera 304. Image-data handler 308 receives image data values 309 from camera 304, uses the image-data values to assemble digital images 311, and transmits digital images 311 to RGB projector 302 to generate visible images, e.g., with which a user can interact. In an alternative example, an image data handler is used to store digital images or transmit them to another system, but is not used to transmit them to an RGB projector.

RGB projector 302 provides red, green, and blue illumination on a time-sequential (one-at-a-time) basis to yield, in effect and on a time-averaged basis, (white) illumination 312 with controlled and known color characteristics. To this end, RGB projector 302 includes a red emitter 310R for emitting red illumination 312R, a green emitter 310G for emitting green illumination 312G, and a blue emitter 310B for emitting blue illumination 312B. Gaps 312X (in controlled illumination output by RGB projector 302) can be formed during durations (phases) in which emitters 310R, 310G, and 310B are all off.

Emitters 310R, 310G, and 310B can be arrays, e.g., of light-emitting diodes (LEDs), so that they can be operated to generate either image-bearing illumination (light in which an image can be seen under some circumstances) or non-image-bearing illumination. Alternatively, white illumination can be used, e.g., with Bayer filters to provide color illumination or images. Non-image-bearing illumination, e.g., uniform illumination, can be used when illuminating objects to be imaged using camera 304. Image-bearing illumination can be used to project an image on a surface, e.g., so that a user can interact with the image. The interactions can be captured using camera 304 and interpreted using image data handler 308 to yield an updated image. In this way, a projected image can serve as a virtual object, e.g., one that can be shared among remote users in a collaborative work environment. In either case, camera 304 can detect a controlled component 314 of incident light, which can include red segments 314R, green segments 314G, blue segments 314B, and gaps 314X.

Light incident camera 304 can also include ambient light 316, including both direct and reflected ambient light. Gaps 312X in controlled illumination result in gaps 314X in the controlled component of light incident camera 304. During gaps 314X, camera 304 detects only incident ambient light 316. During color phases 312R, 312G, 312B, camera 304 detects a combination of controlled-illumination reflections 314 and ambient light 316. The scene 318, which may include an object, an image, and/or interactions to be imaged, is presumably accurately represented by the controlled-illumination reflections, while ambient light 316 is a source of noise and/or distortion.

Camera 304 includes a sensor-channel array 320 and readout/offset circuitry 322. Sensor-channel array 320 is to convert incident light into detections and to accumulate detections so that they are partitioned as a function of the color phase (e.g., R, G, B, or X) of the controlled component of incident light.

Figure 4:
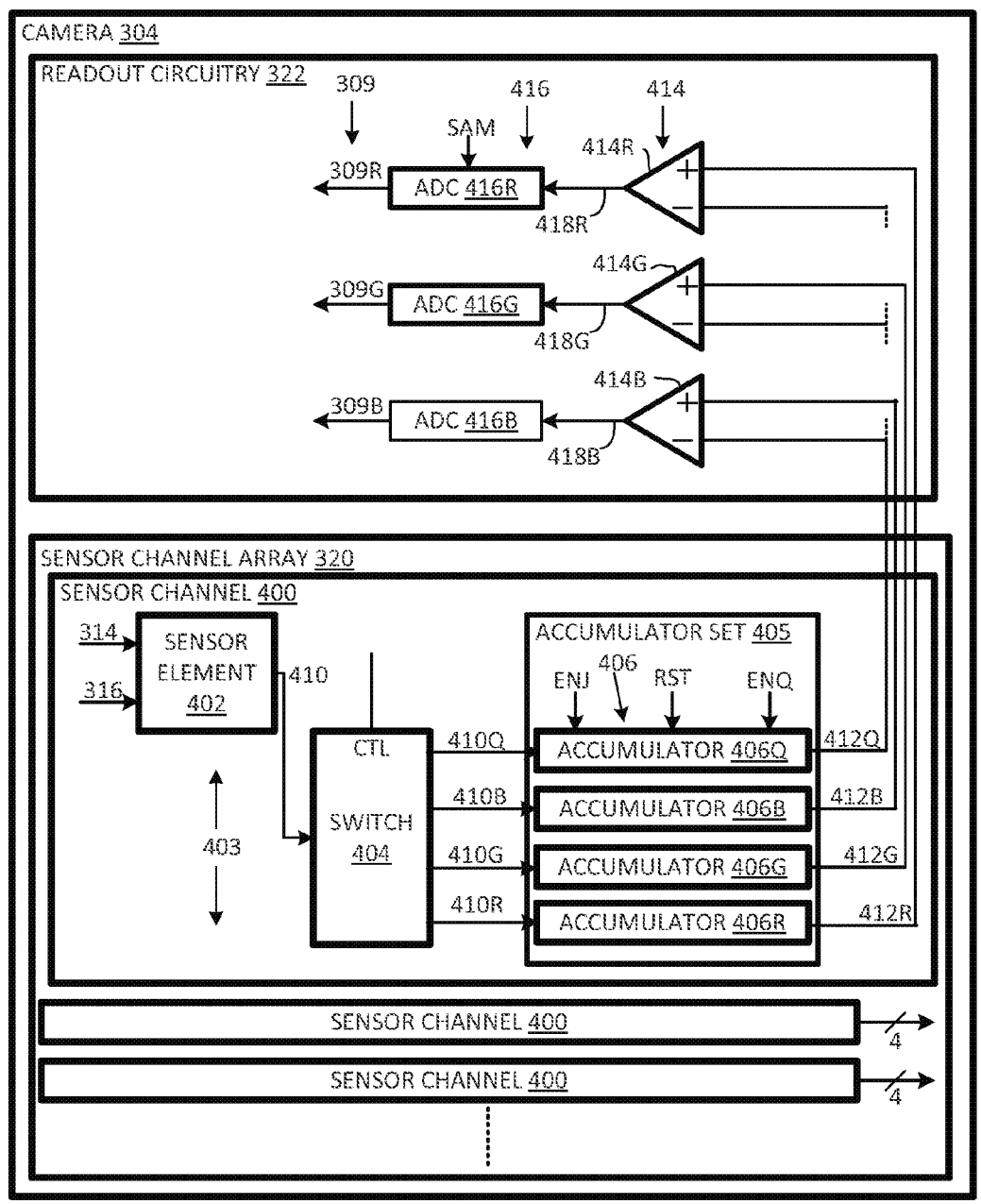
FIG. 4 is a schematic diagram detailing a camera of the imaging system of FIG. 3.

Camera 304 is represented in greater detail in FIG. 4. Sensor-channel array 320 is a two-dimensional array of sensor channels 400. Each sensor channel 400 includes a sensor element 402, a switch 404, and an accumulator set 405 of accumulators 406. Each accumulator set 405 includes a "red-dedicated" accumulator 406R, a "green-dedicated" accumulator 406G, a "blue-dedicated" accumulator 406B, and an "ambient-dedicated" (i.e., "offset-dedicated") accumulator 406Q. Herein, the accumulators are labeled to reflect the source of the detections they are intended to accumulate, e.g., red-dedicated accumulator 406R accumulates detections generated from incident light including reflections 414R of red illumination 412R.

Collectively, sensor elements 402 define a sensor array 403. Each sensor element 402 is to convert incident light, e.g., including ambient light 316 and/or reflections 314 of controlled illumination, to detections 410, e.g., electrical charges. Each switch 404 is to route detections as a function of the color-phase of the incident light from which the detections were generated. For example, detections resulting from reflections of green emissions 312G are directed to green-dedicated accumulator 406G. To this end, timing controller 306 (FIG. 3) is coupled to emitters 310R, 310G, and 310B and to a control port CTL of each switch 404 to synchronize (i.e., coordinate the timings of) emissions and routings. Thus, switch partitions detections 410 into red, green, blue, and offset detections 410R, 410G, 410B, and 410Q.

Each accumulator 406 is to accumulate detections routed to it by the respective switch 404 to yield respective accumulations. More specifically, red-dedicated accumulator 406R accumulates detections 410R to yield an accumulation 412R; green-dedicated accumulator 406G accumulates detections 410G to yield an accumulation 412G; blue-dedicated accumulator 406B accumulates detections 410B to yield an accumulation 412B; and ambient-dedicated accumulator 406Q accumulates detections 410Q to yield an accumulation 412Q. In an alternative example, one or more additional accumulators may be included, e.g., an IR-dedicated accumulator to accumulate detections generated in response to incident infra-red light; for example, the infra-red light may have been emitted by a projector or by a separate source such as an infra-red pen used to (virtually) annotate an object or image.

In an example, an integrating capacitor can be used to store accumulated detections in the form of charges. In other examples, the detections and accumulators can take other forms. For example, the detections can take the form of light pulses and the accumulators can include counters to tally light pulses.

Each accumulator 406 includes an input enable port ENJ, a reset port RST, and an output enable port ENQ. In imaging system 300 (FIG. 3), all these ports are controlled by timing controller 306. Input enable port ENJ can be controlled to determine, at any given time, whether an accumulator accepts new detections at its input. Output enable port ENQ can be controlled to determine, at any given time, whether the accumulation accumulated therein can be read out, e.g., by readout circuitry 322. Reset port RST can be controlled to reset the respective accumulator to an initial state corresponding to zero accumulation.

Sensor-channel array 320 can be a backside-illuminated CMOS sensor. Sensor elements 402 can be fabricated as an array on the backside of a CMOS integrated circuit, while switches 404 (e.g., transistor-based structures) and accumulators 406 are fabricated on the front side. This allows a full surface to be dedicated to detecting incident light. In other examples, other sensor technology can be used for the sensor-channel array. In some examples, readout circuitry is formed on the same integrated circuit as a sensor-channel array in other examples, separate integrated circuits are used.

Readout circuitry 322 includes amplifiers 414 and analog-to-digital converters (ADCs) 416. Amplifiers 414 include a red-dedicated amplifier 414R, a green-dedicated amplifier 414G, and a blue-dedicated amplifier 414B. Each amplifier 414R, 414G, 414B has a positive input coupled to an output of a respective accumulator 406R, 406G, and 406B. Each amplifier 414R, 414G, and 414B has a negative input coupled to an output of offset accumulator 406Q. As a result of this configuration, amplifiers 414R, 414G, and 414B output respective adjusted red, green, and blue accumulator values 418R, 418G, and 418B that represent incident light components attributable to controlled illumination 312 (FIG. 3) with contributions from ambient light 316 to the total incident light removed.

ADCs 416 convert the adjusted (ambient-light-compensated) accumulations to adjusted (ambient-light-compensated) image-data values 309. Thus, red-dedicated ADC 416R outputs adjusted red-component image data values 309R; green-dedicated ADC 416G outputs adjusted green-component image data values 309G; and blue-dedicated ADC 416B outputs adjusted blue-component data values 309B. In an alternative example, a single ADC stage sequentially reads out and converts adjusted RGB values from respective offset amplifiers or other offset elements. Output enable ports ENQ of accumulators can be used to determine which accumulator is being output.

Image data values 309 are provided to image-data handler 308 (FIG. 3), which uses the received image data values to construct digital images 311 (FIG. 3). Depending on the implementation, image-data handler 308 may store digital images 311, transmit them to projector 310, and/or transmit then to another system for display. Since offsetting occurs "upstream" of the conversion to digital, the offsetting is said to occur in the "analog domain". Analog offsetting adds negligible latency to image capture. In an alternative example, offsetting occurs in the "digital domain", i.e., digital offsetting occurs downstream of ADCs that convert accumulations to digital values.

As represented in FIG. 4, readout circuitry 322 serves all sensor channels 400. Alternatively, there can be separate readout/offset circuitry for each sensor channel. In that case, each sensor channel may be thought of as including readout/offset circuitry. In another example, each sensor channel includes a respective analog offset circuit, e.g., amplifier, while each ADC serves all sensor channels. Other variations are provided as well. For example, each ADC or each combination of ADC and offset circuit can serve plural, but less than all, sensor channels.

Figure 5:
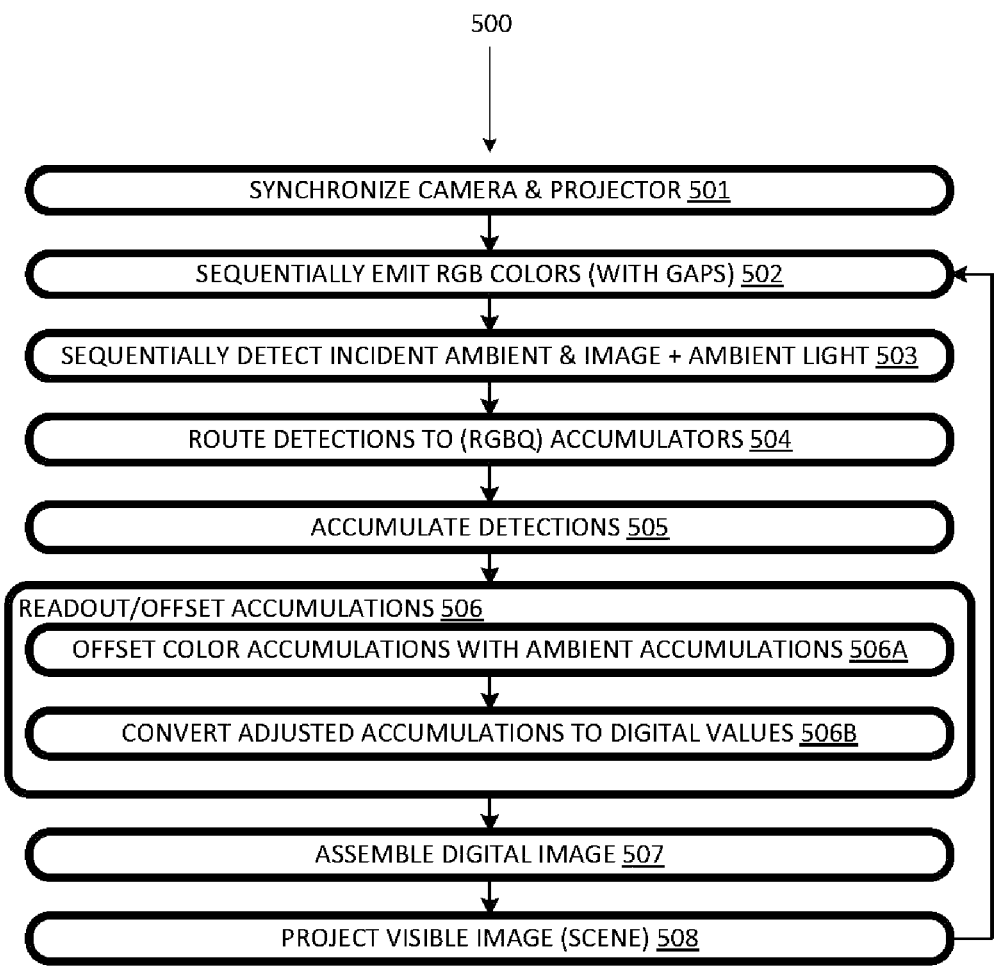
FIG. 5 is a flow chart of an imaging process implementable using the imaging system of FIG. 3 in accordance with an example.

An imaging process 500, flow charted in FIG. 5, can be implemented using imaging system 300 or another imaging system. At 501, a camera and a projector are synchronized. In the context of imaging system 300, this can include programming or otherwise configuring timing controller 306 so that RGB projector 302 and camera 304 can carry out the rest of imaging process 500.

At 502, RGB colors are sequentially emitted along with gaps. In the context of imaging system 300, this can include timing controller 306 sequentially activating emitters 310R, 310G, and 310B, leaving one or more gaps per RGB color cycle. For example, the emission pattern can consist of repetitions of the pattern element RGBX, where "X" marks a gap. Other repeating patterns are also provided for: for example, the emission pattern can include pattern elements such as RXGXBX where a gap is inserted between successive color emissions.

In some examples, the durations of the (RGBX) color phases have equal durations; in other examples, the gaps can have durations that differ from the RGB phase durations. In still other examples, the RGB phases may differ in duration. For example, a blue phase can be longer than a red phase, e.g., to compensate for a blue emitter of lower intensity than the red emitter. Where the gap duration is different from one or more of the RGB color phase durations, some scaling, e.g., of the offset accumulations, may be used to compensate for the duration differences.

Note that the emitted RGB light may be image bearing, e.g., include R, G, and B separations of an image. Alternatively, the emitted RGB light may be non-image bearing. For example, nominally uniform light can be used to illuminate a document or other physical object for image capture.

At 503, incident light is detected. During emission gaps, only ambient light is detected; during RGB color phases, ambient light plus reflections of controlled RGB emissions are detected. The ambient and ambient+illumination (ambient together with reflections of controlled emissions) are detected in different time intervals, i.e., "sequentially".

At 504, incident light detections are sequentially routed to (and, thus, partitioned among) accumulators. In the context of imaging system 300, timing controller 306 controls RGB projector 302 and switches 404 so that detections are routed to accumulators as a function of the color phase of the incident light. For example, detections 410R, resulting from incident light including a component that is a reflection 314R of a red emission 312R, are routed to red accumulator 406R. For another example, detections 410Q, resulting from incident light including only ambient light, i.e., during gaps 314X, are routed to offset-dedicated (ambient-light-dedicated) accumulator 406Q. The accumulations of detections in respective accumulators are mutually exclusive in that no accumulator includes detections routed to another accumulator.

At 505, detections are accumulated to yield accumulations. For example, in the context of imaging system 300, detections 41 OR are accumulated to yield accumulations 412R. In general, the detections are accumulated in an accumulator to which they are routed and which has its input ENJ enabled. Accumulations increase as detections are received and remain constant when detections are not being received. For example, charges accumulate in an integrating capacitor as they are received. Activation of the reset port RST resets an accumulator to zero. A reset is typically performed after a readout from the respective accumulator. For example, a typical accumulator pattern would include repetitions of the pattern element RGBQ-readout-reset.

At 506, accumulations are read out from accumulators and offset. In the context of imaging system 300, the reading out and offsetting are performed by circuitry 322. In one example, this can include offsetting R, G, and B accumulations with ambient/offset accumulations to yield adjusted ambient-light-compensated R, G, and B accumulations at 506A. In cases where all (RGBX) phases are of equal duration, the offset can be implemented as a simple subtraction. Some scaling can be required when offsetting RGBX color phases of different durations. The adjusted accumulations can then be converted to digital-image values at 506B. In other examples, the conversion to digital precedes the offsetting, so that the offsetting occurs in the digital domain instead of the analog domain.

The duration between readouts can determine a frame rate where the digital image values are to be used for video images. For example, a frame rate of about 30 frames per second is typically experienced as "smooth" by most viewers, although faster and slower frame rates have their uses. For a given readout duration, the number of color-phase cycles during the readout duration determines the opportunity for color errors to occur due to time variations in ambient lighting. If there are two or more color-phase cycles per readout duration, the accumulations will be interleaved, that is, overlapped in time. The more color-phase cycles per readout duration, the more highly interleaved the accumulations and the less opportunity for color errors to occur due to time variations in ambient lighting.

At 507, a digital image is constructed using the image data values. In the context of system 300, image-data handler 308 constructs a raster digital image 311 from the red, green, and blue image-data values 309R, 309G, and 309B. At 508, the digital image can be used to project a visible image. In the context of imaging system 300, digital image 311 can be input to RGB projector 302, which then projects a visible image onto a surface to yield a version of scene 318. Scene 318 may thus include virtual objects with which a human can interact, e.g., in a context of remote collaboration.

In alternative examples, the digital image is not used to re-project the captured image. For example, the captured image may simply be stored and it may be transmitted to another system for display. The scene and interactions can then be captured in future interactions of actions 502-508.

In summary, color errors due to spatial variations in ambient lighting are minimized since ambient light levels are compensated for on a pixel-by-pixel (i.e., per sensor-element) basis. Color errors due to temporal variations in ambient lighting are minimized since ambient light levels are compensated for on a per-readout period basis. Further reductions in color errors due to temporal variations in ambient lighting are achieved to the extent accumulations are interleaved (e.g., by using short-duration color phases to achieve multiple color-phase cycles per readout duration).

Herein, a "system" is a set of interacting non-transitory tangible elements, wherein the elements can be, by way of example and not of limitation, mechanical components, electrical elements, atoms, physical encodings of instructions, and process actions. Herein, "process" refers to a sequence of actions resulting in or involving a physical transformation. Herein, "device" refers to a programmable or non-programmable hardware element.

Herein, "imaging" encompasses capturing, manipulating, and/or generating an image. Herein, "image" encompasses digital images and visible images. A "visible" image is a spatial distribution of light perceptible to humans. A "digital image" is a computer-readable data structure that represents a visible image.

Herein, a "projector" is a device for projecting image-bearing or non-image-bearing light. Thus, "projector" encompasses conventional slide and movie projectors as well as their digital equivalents (that project images encoded as data). However, "projector", as used herein, also includes non-imaging light sources including simple light-emitting diodes (LEDs), and RGB LEDs, such as those used for object illumination, e.g., for document capture or other object imaging.

"Color-sequential illumination" and related phrases such as "sequentially emitting" and "sequentially projection" refer to emitting different colors at different times in a sequence to achieve time-averaged perceptions of combination color. For example, red, green, and blue can be projected in sequence to yield a time-averaged perception of white (or other color, depending on the relative amounts of red, green, and blue).

Herein, a "sensor" is a device for converting incident light into "detections". Herein, a "detection" is a representation of an amount of incident light generated by a sensor or sensor element. A "sensor" can include sensor elements, e.g., arranged in an array, each of which converts locally incident light to another form, e.g., to capture an image. Herein, a "sensor channel" includes a sensor element and other elements dedicated to handling detections or resulting data associated with that sensor element to the exclusion of other sensor elements in the same sensor array.

Herein, "detection of light of a given color" means that a detection results when light of that color is incident the sensor; it does not necessarily mean that the detection is any different than a detection of light of a different color. For example, a detection (e.g., in the form of an electrical charge) of red light can be indistinguishable from a detection (e.g., in the form of an electrical charge) of blue light. Thus, a "full-range" sensor is a sensor that can detect light of all colors of interest. This is in contrast to color-specific filters, which because of their characteristics or because of the presence of color filters (e.g., in a Bayer pattern) detect only a respective one of plural colors of interest (e.g., the other colors may be detected by other sensors in the same array).

Herein, an "accumulator" is a device for accumulating or counting detections. Herein, a "set" requires at least two elements (e.g., accumulators) as members. Sets are "mutually exclusive" when they have no elements/members in common. Herein, a "switch" is a device for selectively coupling one of its plural outputs at a time to its input according to a value of a signal at its control port.

Herein, unless otherwise apparent from context, the terms "red", "green", "blue" and "offset" are used as labels that refer to the function to which an item described is dedicated rather than the physical characteristics of that item. For example, while red emissions are red in color, red detections, red accumulators, red accumulations, red amplifiers, and red ADCs are not red in color. In those contexts, the term "red" relates back to the emission color that they correspond to functionally. For example, red accumulator 406R accumulates red detections 410R that were generated from incident light including reflections 314R of red emissions 312R.

In this specification, related art is discussed for expository purposes. Related art labeled "prior art", if any, is admitted prior art. Related art not labeled "prior art" is not admitted prior art. In the claims, "said" introduces elements for which there is explicit verbatim antecedent basis; "the" introduces elements for which the antecedent basis may be implicit. The illustrated and other described embodiments, as well as modifications thereto and variations thereupon are within the scope of the following claims.

What is claimed is:

1. An imaging system comprising:
   a sensor element to:
      output first detections responsive to combined light comprising ambient light and light from a controlled light source, and
      output second detections responsive to ambient light in an absence of light from the controlled light source;
   a plurality of accumulators;
   a switch to:
      route the first detections to a first accumulator of the plurality of accumulators, the first accumulator to accumulate the first detections to produce a first accumulation, and
      route the second detections to a second accumulator of the plurality of accumulators, the second accumulator to accumulate the second detections to produce a second accumulation; and
   a readout circuit comprising an amplifier, the readout circuit to receive the first accumulation and the second accumulation, and to remove a contribution of the second accumulation from the first accumulation, wherein the amplifier comprises a positive input to receive the first accumulation, and a negative input to receive the second accumulation, and the amplifier is to output an adjusted image value based on the first and second accumulations.

2. The imaging system of claim 1, further comprising:
   a timing controller to synchronize the controlled light source and the switch, the timing controller to control the switch to route the first detections to the first accumulator and the second detections to the second accumulator according to activation and deactivation of the controlled light source.

3. The imaging system of claim 1, wherein:
   the controlled light source is a first controlled light source to produce first color light,
   the first detections are responsive to combined light comprising ambient light and the first color light from the first controlled light source,
   the sensor element is to output third detections responsive to combined light comprising ambient light and second color light from a second controlled light source,
   the switch is to route the third detections to a third accumulator of the plurality of accumulators, the third accumulator to accumulate the first detections to produce a third accumulation, and
   the readout circuit is to further receive the third accumulation, and to remove a contribution of the second accumulation from the third accumulation.

4. The imaging system of claim 3, further comprising a controller to control the first controlled light source and the second controlled light source to provide an interleaved pattern of illuminations comprising the first color light, the second color light, and an illumination gap without the first color light and the second color light.

5. The imaging system of claim 3, further comprising:
   a projector including the first controlled light source and the second controlled light source.

6. The imaging system of claim 3, wherein the first detections are routed to just the first accumulator, the second detections are routed to just the second accumulator, and the third detections are routed to just the third accumulator.

7. The imaging system of claim 3, further comprising:
   a timing controller to sequentially activate enable ports of the first, second, and third accumulators to receive, respectively, the first, second, and third detections.

8. The imaging system of claim 1, wherein each of the first and second accumulators comprises a respective integrating capacitor to accumulate charge from the respective first and second detections.

9. A method comprising:
   controlling a controlled light source to output light;
   outputting, by a sensor element:
      first detections responsive to a combined light comprising ambient light and the light output by the controlled light source when the light source is on, and
      second detections responsive to ambient light in an absence of light from any controlled light source;
   route the first detections to a first accumulator to produce a first accumulation, and route the second detections to a second accumulator to produce a second accumulation; and
   generate an adjusted output image by removing a contribution of the second accumulation from the first accumulation using an amplifier having a first input that receives the first accumulation, and having a second input that receives the second accumulation.

10. The method of claim 9, wherein the controlled light source is a first controlled light source to output a first color light, the method further comprising:
    controlling a second controlled light source to output second color light,
    wherein the controlling of the first controlled light source and the second controlled light source produces an interleaved pattern of illuminations comprising the first color light, the second color light, and an illumination gap without the first color light and the second color light, and
    wherein the second detections output by the sensor element are responsive to the ambient light with the first and second controlled light sources off.

11. The method of claim 10, further comprising:
    outputting, by the sensor element, third detections responsive to a combined light comprising ambient light and the second color light output by the second light source,
    routing the third detections to a third accumulator to produce a third accumulation,
    wherein generating the adjusted output image further comprises removing a contribution of the second accumulation from the third accumulation.

12. The method of claim 11, further comprising:
    controlling, by a timing controller, the first, second, and third accumulators to receive the first, second, and third detections at different times.

13. The method of claim 9, wherein the controlled light source is a first controlled light source to output first color light, the method further comprising:
    controlling a second controlled light source to output second color light, and controlling a third controlled light source to output third color light,
    wherein the second detections output by the sensor element are responsive to the ambient light with the first, second, and third controlled light sources off.

14. The method of claim 9, wherein the removing of the contribution of the second accumulation from the first accumulation is performed in an analog domain.

15. The method of claim 14, wherein the first input of the amplifier is a positive input that receives the first accumulation, and the second input of the amplifier is a negative input that receives the second accumulation.

16. An imaging system comprising:
a plurality of light emitters controllable to emit respective different color light;
a sensor element to:
output first detections responsive to combined light comprising ambient light and first color light from a first light emitter of the plurality of light emitters,
output second detections responsive to combined light comprising ambient light and second color light from a second light emitter of the plurality of light emitters, and
output third detections responsive to ambient light in an absence of light from the plurality of light emitters;
a plurality of accumulators;
a switch to:
route the first, second, and third detections to respective first, second, and third accumulators of the plurality of accumulators; and
a readout circuit comprising amplifiers, the readout circuit to receive first, second, and third accumulations from the respective first, second, and third accumulators, a first amplifier of the amplifiers having a positive input to receive the first accumulation and a negative input to receive the second accumulation to remove a contribution of the second accumulation from the first accumulation, and a second amplifier of the amplifiers having a positive input to receive the third accumulation and a negative input to receive the second accumulation to remove a contribution of the second accumulation from the third accumulation.

17. The imaging system of claim 16, further comprising a controller to control the plurality of light emitters to provide an interleaved pattern of illuminations comprising the first color light, the second color light, and an illumination gap without the first color light and the second color light.

18. The imaging system of claim 16, wherein the sensor element is to output the third detections responsive to ambient light with all of the plurality of light emitters off.

* * * * *